E. B. BLISS.
AUTOMOBILE.
APPLICATION FILED JUNE 11, 1913.
1,131,034.
Patented Mar. 9, 1915.
3 SHEETS—SHEET 2.
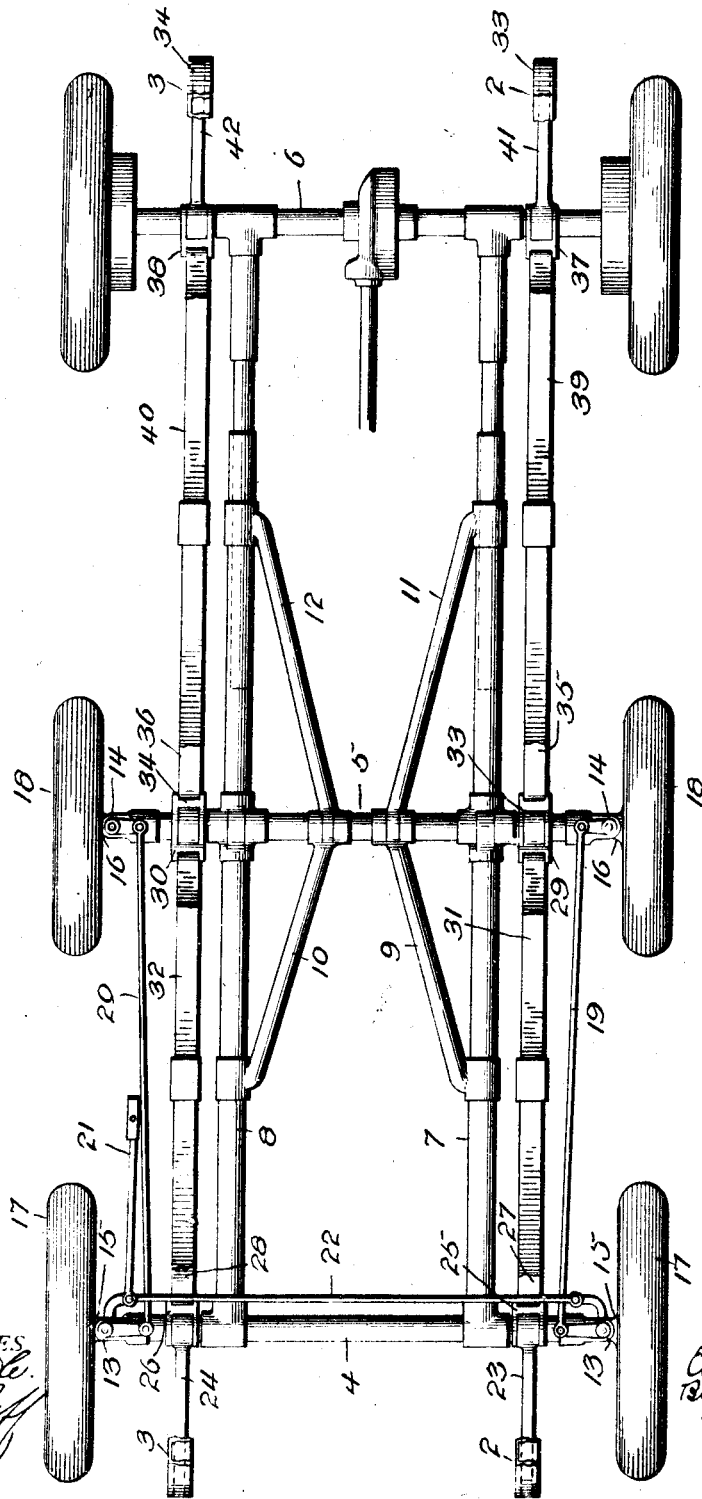

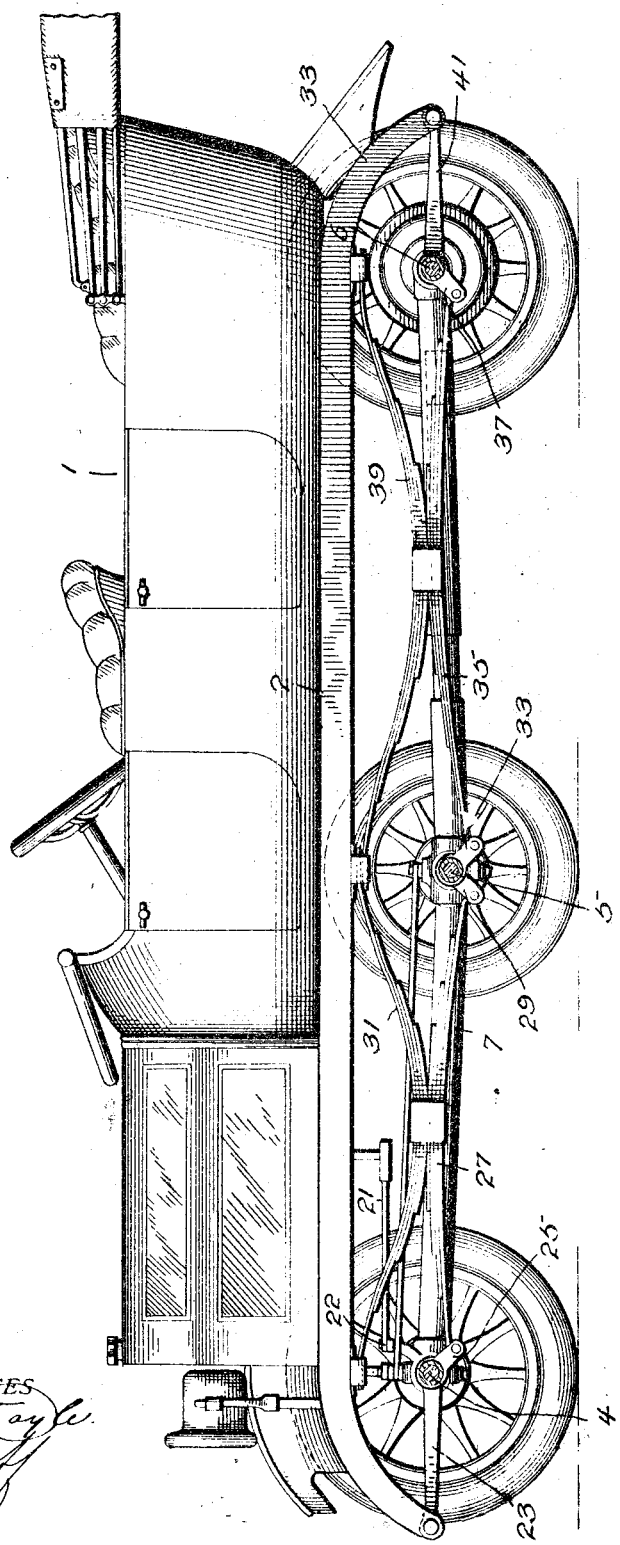

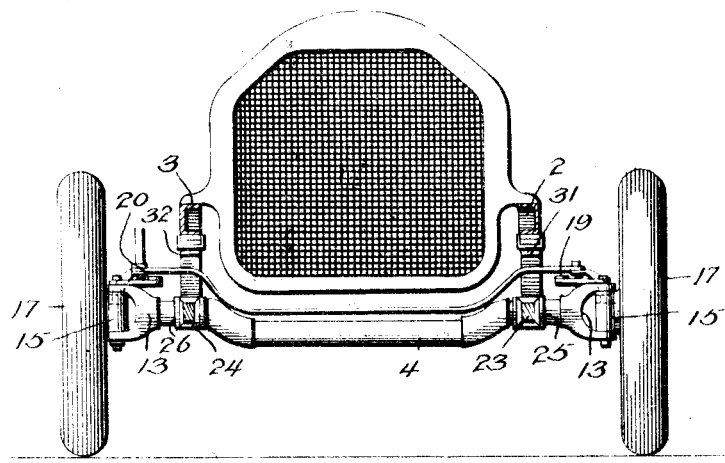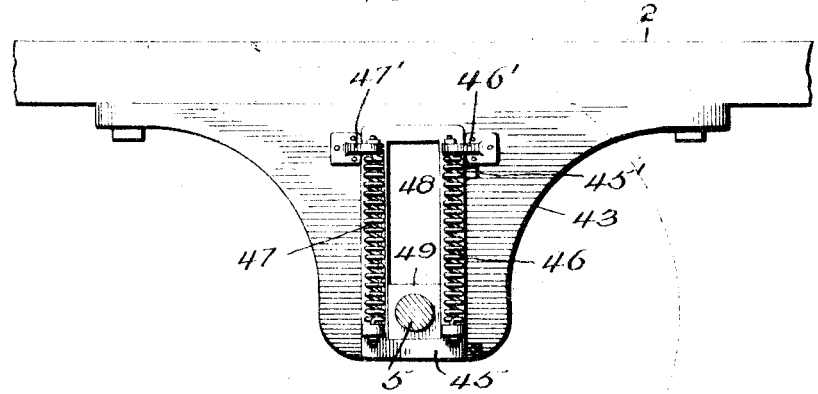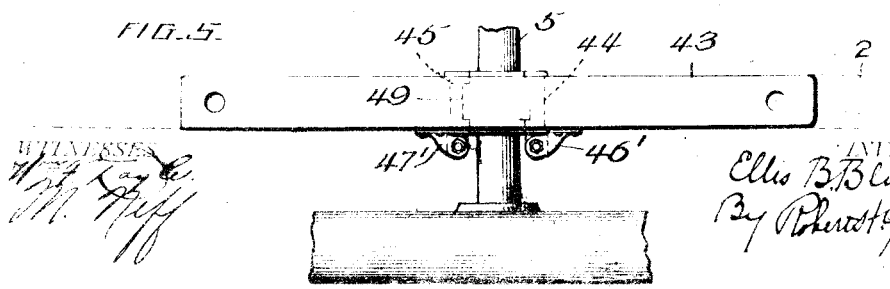

UNITED STATES PATENT OFFICE.

ELLIS B. BLISS, OF NEW YORK, N. Y.

AUTOMOBILE.

1,131,034.  Specification of Letters Patent.  Patented Mar. 9, 1915.

Application filed June 11, 1913. Serial No. 772,980.

*To all whom it may concern:*

Be it known that I, ELLIS B. BLISS, a citizen of the United States, residing at New York city, in the county of New York and State of New York, have invented a new and useful Improvement in Automobiles, of which the following is a specification.

My invention relates to improvements in automobiles and pertains particularly to the spring connection between the body of the car and the wheel axles.

The object of my invention is to so arrange the springs of an automobile that a sudden rebound of the body of the automobile is prevented to a great extent and yet provides the proper resiliency necessary for the easy riding of the car.

Another object of my invention is to provide a simple, cheap and more effective arrangement of the springs, having certain details of structure hereinafter more fully described.

In the accompanying drawings—Figure 1 is a side elevation of an automobile having six wheels embodying my invention; Fig. 2 is a top view of Fig. 1, showing the body of the car removed; Fig. 3 is a front view of Fig. 1; Fig. 4 is a side elevation of the bearing brackets for vertically and movably mounting the center axle; and Fig. 5 is a plan view of Fig. 4.

Referring now to the drawings, 1 represents the body of an automobile which is provided with a longitudinal bar 2 and 3 at each side and which extends beyond the forward and rear ends of the automobile frame.

In the form of automobile shown in Figs. 1 and 2 of the drawings, I provide drop axles 4 and the usual straight rear drive axles 5 and 6, which are connected together by longitudinal telescoping bars 7 and 8, carried in a rigid frame comprising longitudinal tubular members having cross-brace bars 9, 10, 11 and 12, as shown in Fig. 2 of the drawings, and which, together with the axles, form a rectangular frame, on which the axles are adjustable toward or from each other by the telescoping action of the members. The two forward axles 4 and 5 are provided with knuckle joints 13 and 14 which carry the axle spindles 15 and 16, carrying the wheels 17 and 18. The knuckle joints 13 and 14 are connected by the bars 19 and 20 and the forward knuckle joints have connected thereto the steering rods 21 and 22, and are connected to the steering post in the usual manner, whereby the two sets of forward wheels are moved by the steering wheel for steering the vehicle.

The two longitudinal side bars 2 and 3, carried by the body of the vehicle, as heretofore described, extend beyond the body and are carried downwardly. Pivotally connected to the forward end of the bars are arms 23 and 24, which extend rearwardly and are swingingly attached to the forward drop axle 4. The said axle adjacent to the connection of the arms therewith, is provided with downwardly and slightly rearwardly extending arms 25 and 26, which have swinging movement with the axle. Connected to the lower ends of the arms 25 and 26 are springs 27 and 28, which are of the ordinary leaf form. The connection of the said springs with the arms 25 and 26 is a swinging one, and the rear ends of the springs have a like swinging connection with the arms 29 and 30, carried by the axle. Rigidly attached to the center of the springs 27 and 28 are springs 31 and 32, which extend upwardly and engage the lower faces of the side bars 2 and 3, which support the vehicle body.

The axle 5 is also provided with downwardly extending arms 33 and 34, with which the springs 35 and 36 have a swinging connection, the said springs having at their rear ends a swinging connection with the arms 37 and 38 carried by the rear axle 6. These springs 35 and 36, at their center, have rigidly connected thereto, springs 39 and 40, which extend rearwardly and engage the underface of the side bars 2 and 3. The rear axle 6 is provided with pivoted bars 41 and 42, which extend rearwardly and are pivotally connected to the downwardly turned ends of the side bars 2 and 3.

By the structure shown and described, it will be seen that the body of the automobile is supported normally by the springs 31 and 32 and the springs 39 and 40. When any weight is placed within the body, or the same is caused to move downwardly by traveling over rough roads the springs 31, 32, 39 and 40 are compressed and the side bars 2 and 3 travel downwardly, and the arms pivotally connected thereto are moved downwardly and rocked on the forward axle 4 and the rear axle 6. The springs 27, 28, 35 and 36 engage the arms carried by the axles and prevent the sudden return of the body to its normal position, whereby all sudden compression and rebounding of the springs is prevented, which lessens the liability of breaking the springs.

In automobiles where six wheels are used, it has been necessary for the central axle 5 to have a vertical movement independent of the body of the car, so that, in passing over uneven ground, the central wheels will at all times contact with the ground and at the same time allow the rear and forward wheels to remain upon the ground. This vertical movement on very uneven ground has been found to be considerable, and in order to prevent the support from extending below the axle to any extent, I have provided the bearing bracket 43, as shown in Figs. 4 and 5 of the drawings.

The brackets 43, as shown, are secured to the underside of the longitudinal side bars 2 and 3. Each bracket is provided at its center with a vertical slot 44, which extends entirely through the lower face thereof. The vertical walls of said slot are grooved, as shown in dotted lines in Fig. 5 of the drawings, and in the groove is the vertically slidable member 45, to the lower end of which are secured the springs 46 and 47, the upper ends of the springs being secured to the lugs 46' and 47' carried by the brackets to hold the member in its uppermost position. The members 45 have lugs 45' at their upper ends to engage a lug or flange at the lower end of the brackets to prevent the same from sliding out of the brackets. Said members 45 have a closed slot 48 therethrough, in which is mounted the bearing block 49 through which the axle 5 passes, the said block being free to move vertically within the slot.

From the structure thus described, it will be apparent that, when the automobile comes upon uneven ground and the springs 27, 28, 35 and 36 force the central axle downwardly, the bearing block 49 engages the lower end of the slot 48 and forces the member downwardly beyond the bracket against the tension of the springs 46 and 47, such action taking place when the ground under the front and the rear wheels is higher than that between the same. When the ground is higher between the rear and front wheels, the bearing block 48 rides upward within the slot in the member 45, and thus the center wheels are at all times on the ground, while at the same time preventing the front and rear wheels from being lifted from the ground by the center wheels.

It will be appreciated that the principles of my invention may be applied to a vehicle having four wheels, wherein the shock and vibration of the wheels caused by uneven ground may be absorbed by springs of the structure shown.

Having thus fully described my invention, what I claim as new and desire to secure by Letters Patent, is:

1. A wheeled vehicle, comprising a frame consisting of longitudinal bars comprising telescoping members, cross axles carried in said frame and adjustable toward or from each other through the movement of telescoping members of said bars, springs swingingly carried on the axles, and a body frame mounted on said springs.

2. A wheeled vehicle, comprising tubular longitudinal members having longitudinal bars telescoping therewith at each end, cross axles mounted on said movable telescoping bars, depending arms pivotally mounted on said axles, springs swingingly carried on said arms, and a body frame mounted on said springs.

3. A wheeled vehicle comprising a frame of telescoping tubular longitudinal members, cross axles mounted on said telescoping members, depending arms pivotally mounted on said axles, forwardly and rearwardly extending links pivotally carried by the front and rear axles respectively and pivotally connected to the body of the vehicle, springs swingingly carried on said depending arms and a body frame mounted on said springs and links.

4. In a wheeled vehicle the combination with a rigid frame comprising longitudinal tubular members having cross braces, longitudinally extending bars, movably carried in said tubular members, a cross axle mounted on said rigid frame and cross axles mounted on said movable bars, depending arms pivotally mounted on said axles, springs swingingly carried on said arms between the axles, links pivotally mounted on said front and rear axles extending forwardly and rearwardly respectively, and a body frame pivotally mounted on said links and springs.

5. In a wheeled vehicle, the combination with a frame of telescoping tubular longitudinal members, cross axles carried on the ends of the movable members thereof and an intermediate cross axle carried on the rigid portion thereof, depending arms pivotally mounted on said axles, leaf springs pivotally carried on said arms between the axles, upwardly extending springs, carried by said first mentioned springs, horizontal links pivotally mounted on said front and rear axles extending forwardly and rearwardly, respectively, and a body frame mounted on said links and springs.

6. In a motor vehicle, the combination with a frame of telescoping tubular longitudinal members, wheel axles carried on the ends of the movable members of said frame and an intermediate wheel axle mounted on the rigid portion thereof, depending arms pivotally mounted on said axles, leaf springs swingingly carried on said arms between the axles, leaf springs rigidly carried by said first mentioned springs intermediate their ends extending forwardly and rearwardly and engaging the under face of the body frame of the vehicle, horizontal links pivotally mounted on said front and rear axles, extending forwardly and rearwardly, and side bars on the vehicle body having downwardly turned ends pivotally connected with said links, and bearing intermediate their ends upon said second mentioned springs.

7. An automobile, comprising a front and rear axle, brackets intermediate the axles, members sliding in said brackets, axle bearing blocks sliding in the said members, and a third axle in the said bearing blocks, substantially as shown and described.

8. An automobile, comprising a front and rear axle, brackets intermediate the axles, members sliding in the said brackets, springs for normally holding the members in their uppermost position in the brackets, bearing blocks in the said members, and a third axle within the said bearing blocks, substantially as shown and described.

9. An automobile, comprising a front and rear axle, brackets intermediate the axles, members sliding in the said brackets, springs for normally holding the members in their uppermost position within the brackets, bearing blocks within the said member, a third axle mounted in said bearing blocks, and springs connecting the center axles with the forward and rear axles and normally exerting a downward pressure on the center axle.

10. A wheeled vehicle, comprising a body frame, brackets mounted on said frame, sliding members carried in said brackets, axle-bearing blocks sliding in said members, and cross axles carried in said blocks, substantially as described.

11. A wheeled vehicle, comprising a body-frame, brackets mounted thereon, sliding members carried in said brackets, springs for normally holding said members in their uppermost position in the brackets, axle-bearing blocks carried in said slidable members, and cross axles carried in said blocks.

ELLIS B. BLISS.

Witnesses:
H. J. FINDLE,
R. H. YOUNG.